US012800869B2

(12) United States Patent
Gao et al.

(10) Patent No.: US 12,800,869 B2
(45) Date of Patent: Nov. 17, 2026

(54) CAMERA MODULE AND ELECTRONIC DEVICE

(71) Applicant: VIVO MOBILE COMMUNICATION CO., LTD., Dongguan (CN)

(72) Inventors: Kunlin Gao, Dongguan (CN); Jiaqi Su, Dongguan (CN); Xiaonan Zhang, Dongguan (CN); Xianhe Du, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 264 days.

(21) Appl. No.: 18/647,031

(22) Filed: Apr. 26, 2024

(65) Prior Publication Data

US 2024/0280780 A1 Aug. 22, 2024

Related U.S. Application Data

(63) Continuation of application No. PCT/CN2022/126923, filed on Oct. 24, 2022.

(30) Foreign Application Priority Data

Oct. 28, 2021 (CN) ......................... 202111265624.2

(51) Int. Cl.
*G02B 7/02* (2021.01)
*H04N 23/50* (2023.01)

(52) U.S. Cl.
CPC ............. *G02B 7/023* (2013.01); *H04N 23/50* (2023.01)

(58) Field of Classification Search
CPC .......... G02B 7/023; G02B 7/02; H04N 23/50; H04N 23/54; H04N 23/55; H04N 23/57
See application file for complete search history.

(56) References Cited

U.S. PATENT DOCUMENTS

2007/0002546 A1* 1/2007 Nomura ................. H04N 23/51 361/748
2007/0097251 A1 5/2007 Fujioka et al.
(Continued)

FOREIGN PATENT DOCUMENTS

CN 105467718 A 4/2016
CN 109561244 A 4/2019
(Continued)

OTHER PUBLICATIONS

Wikipedia, “Convex Set”, Oct. 3, 2021, XP093232794, https://en.wikipedia.org/w/index.php?title=Convex_set&oldid=1047928555.

*Primary Examiner* — Balram T Parbadia
(74) *Attorney, Agent, or Firm* — The Webb Law Firm

(57) ABSTRACT

A camera module includes a base, a photosensitive chip, a first lens, a first support, a driving mechanism, and a first elastic member. The photosensitive chip is disposed on the base, the first support is movably disposed on the base, the first support is provided with the first lens, and a connecting convex portion is disposed on an edge of the first support. The driving mechanism includes a driving source, a lead screw, and a nut, and the connecting convex portion is pressed against the nut under an action of the first elastic member; and the driving mechanism drives the connecting convex portion through the nut, to drive the first support to move along a first direction. In a case that the first support is subjected to an external force, the first elastic member enables the first support to move along a direction close to the photosensitive chip.

16 Claims, 4 Drawing Sheets

(56) References Cited

U.S. PATENT DOCUMENTS

| | | | | |
|---|---|---|---|---|
| 2007/0107343 | A1* | 5/2007 | Nomura | H04N 23/60<br>348/E5.046 |
| 2011/0205645 | A1 | 8/2011 | Oh | |
| 2016/0291344 | A1 | 10/2016 | Terajima | |
| 2022/0099909 | A1* | 3/2022 | Li | H04N 23/57 |
| 2022/0100051 | A1* | 3/2022 | Tanaka | H04N 23/57 |
| 2022/0413356 | A1 | 12/2022 | Jang et al. | |

FOREIGN PATENT DOCUMENTS

| | | | |
|---|---|---|---|
| CN | 213906776 | U | 8/2021 |
| JP | H0192708 | A | 4/1989 |
| JP | 2014146048 | A | 8/2014 |
| WO | 2021071280 | A1 | 4/2021 |
| WO | 2021127922 | A1 | 7/2021 |

* cited by examiner

CAMERA MODULE AND ELECTRONIC DEVICE

CROSS-REFERENCE TO RELATED APPLICATIONS

This application is a Bypass Continuation application of International Patent Application No. PCT/CN2022/126923, filed Oct. 24, 2022, and claims priority to Chinese Patent Application No. 202111265624.2, filed Oct. 28, 2021, the disclosures of which are hereby incorporated by reference in their entireties.

BACKGROUND OF THE INVENTION

Field of the Invention

This application belongs to the field of photography technologies, and specifically, relates to a camera module and an electronic device.

Description of Related Art

Nowadays, with continuous advancement of photography technologies of electronic devices, people expect to capture higher quality images using the electronic devices.

SUMMARY OF THE INVENTION

To solve the foregoing technical problem, this application is implemented as follows:

According to a first aspect, an embodiment of this application provides a camera module, including a base, a photosensitive chip, a first lens, a first support, a driving mechanism, and a first elastic member.

The photosensitive chip is disposed on the base, the first support is movably disposed on the base, the first support is provided with the first lens, and a connecting convex portion is disposed on an edge of the first support.

The driving mechanism includes a driving source, a lead screw, and a nut, the driving source is disposed on the base, the driving source is connected to the lead screw, and the nut is in thread fit with the lead screw; one end of the first elastic member is connected to the base, the other end of the first elastic member is connected to the first support, and the connecting convex portion is pressed against the nut under the action of the first elastic member; and the driving mechanism drives the connecting convex portion through the nut, to drive the first support to move along a first direction, where the first direction is a direction close to or away from the photosensitive chip.

In a case that the first support is subjected to an external force, the first elastic member is capable of making the first support move along a direction close to the photosensitive chip.

According to a second aspect, an embodiment of this application provides an electronic device, including the foregoing camera module.

REFERENCE NUMERALS

110—base, 120—first lens, 130—first support, 131—connecting convex portion, 131*a*—through hole, 131*b*—notch, 132—first guide portion, 133—first extension portion, 140—driving mechanism, 141—driving source, 142—lead screw, 143—nut, 144—first gear, 145—second gear, 146—third gear, 150—first elastic member, 160—second support, 161—second guide portion, 162—second extension portion, 170—second lens, 180—second elastic member, 190—first guide column, 210—second guide column, 220—position detection means, 221—magnetic member, 222—detection element, 230—cushioning member, 240—electrical connection member, 250—sliding bearing.

DESCRIPTION OF THE INVENTION

The following clearly describes the technical solutions in embodiments of this application with reference to the accompanying drawings in embodiments of this application. It is clear that the described embodiments are some but not all of embodiments of this application. Based on embodiments in this application, all other embodiments obtained by persons of ordinary skill in the art without creative efforts fall within the protection scope of this application.

The terms “first”, “second”, and the like in this specification and claims of this application are used to distinguish between similar objects rather than to describe a specific order or sequence. It should be understood that the data used in such a way is interchangeable in appropriate circumstances, so that embodiments of this application can be implemented in an order other than those illustrated or described herein. In addition, “and/or” in the specification and claims represents at least one of connected objects, and the character “/” usually indicates that the contextually associated objects have an “or” relationship.

In an actual shooting process, optical zoom allows enlargement of an object being photographed. Optical zoom can magnify the object being photographed by changing a distance between a lens and the object being photographed. Therefore, the lens needs to move during a zoom process. To implement movement of the lens, a driving force may be output by a motor, and the driving force may be transmitted through a transmission mechanism to a lens barrel for mounting the lens, allowing the lens to move.

However, when a user uses an electronic device, a camera module in an extended state is easily subjected to a pressing force due to a fall, a collision, and human pressing. Under the action of the pressing force, a lens barrel of the camera module tends to retract. However, if a motor for outputting a driving force in the camera module does not work, the lens barrel cannot be retracted. As a result, parts included in the camera module are prone to damage. Consequently, such a camera module has a short lifespan.

An electronic device provided in embodiments of this application is described in detail below through specific embodiments and application scenarios thereof in combination with the accompanying drawings.

Figure 1:
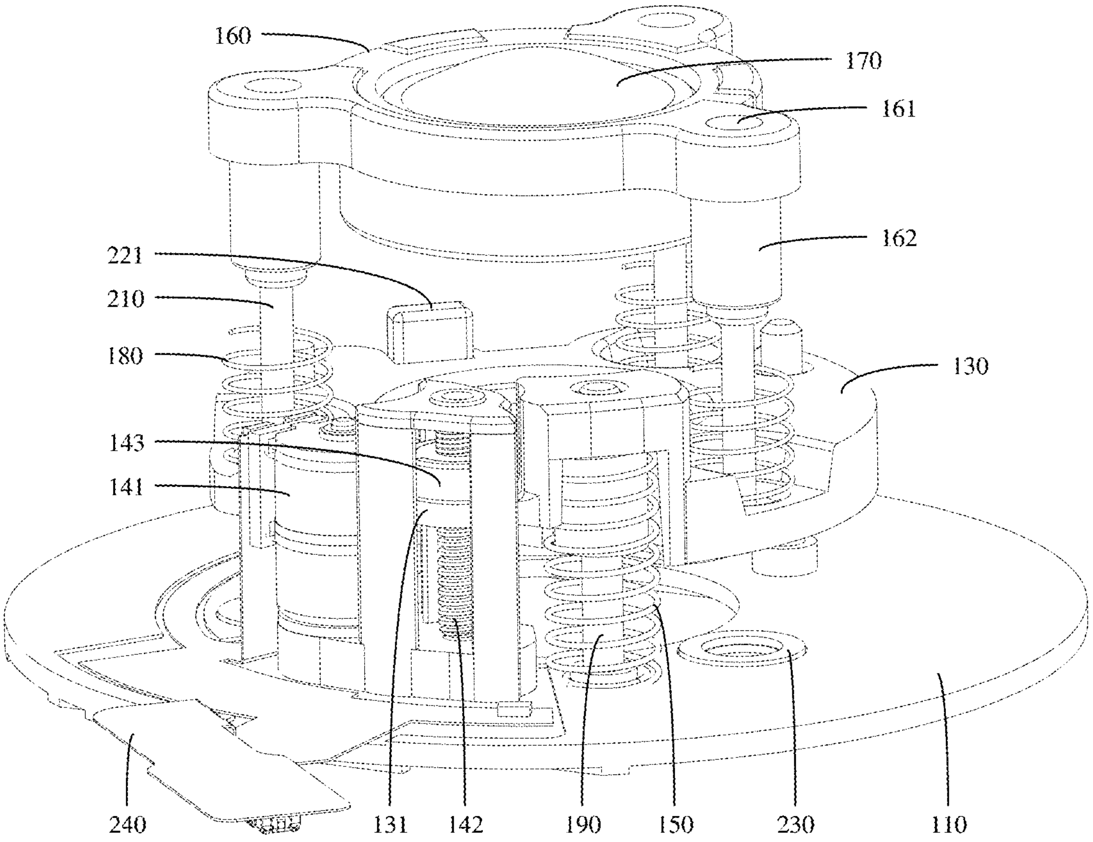
FIG. 1 is a schematic diagram of a structure of a camera module according to an embodiment of this application.
Figure 2:
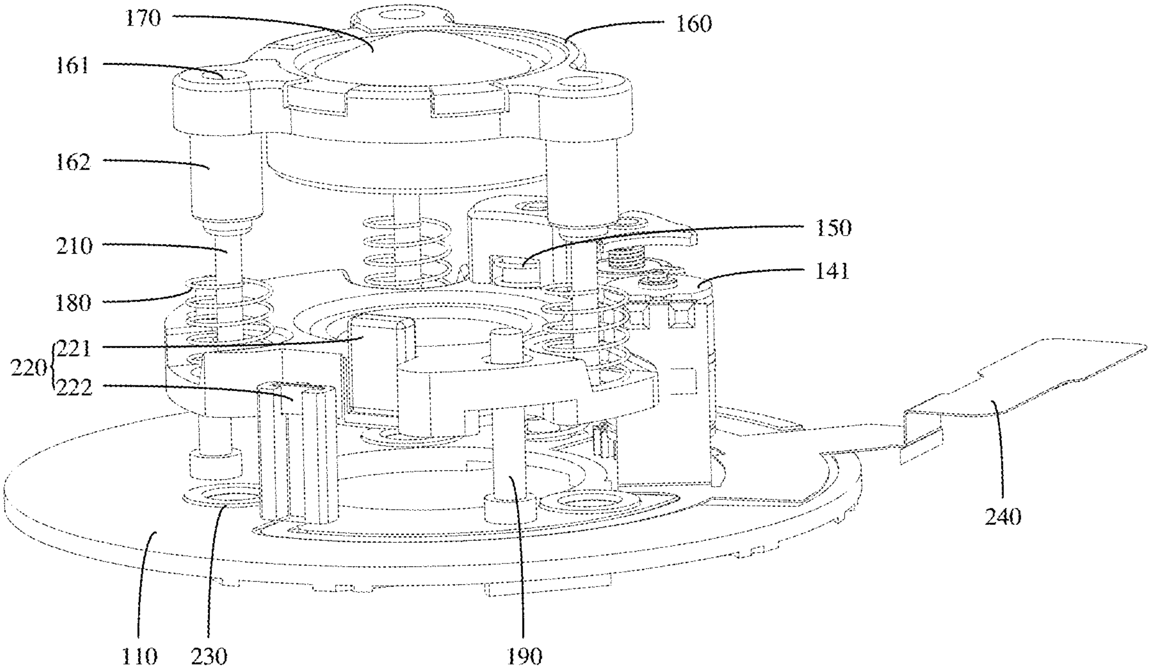
FIG. 2 is a schematic diagram of a structure of a camera module in another view according to an embodiment of this application.
Figure 3:
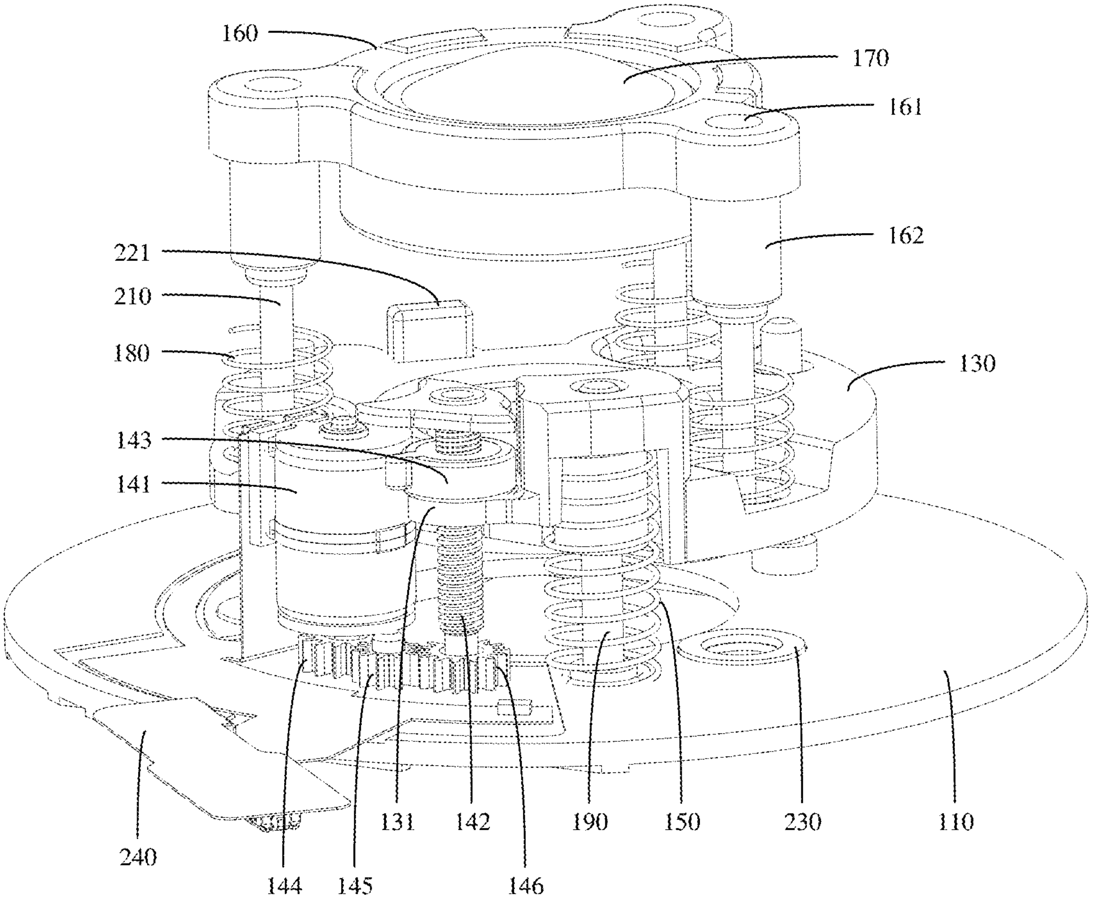
FIG. 3 is a schematic diagram of a partial structure of a camera module according to an embodiment of this application.
Figure 4:
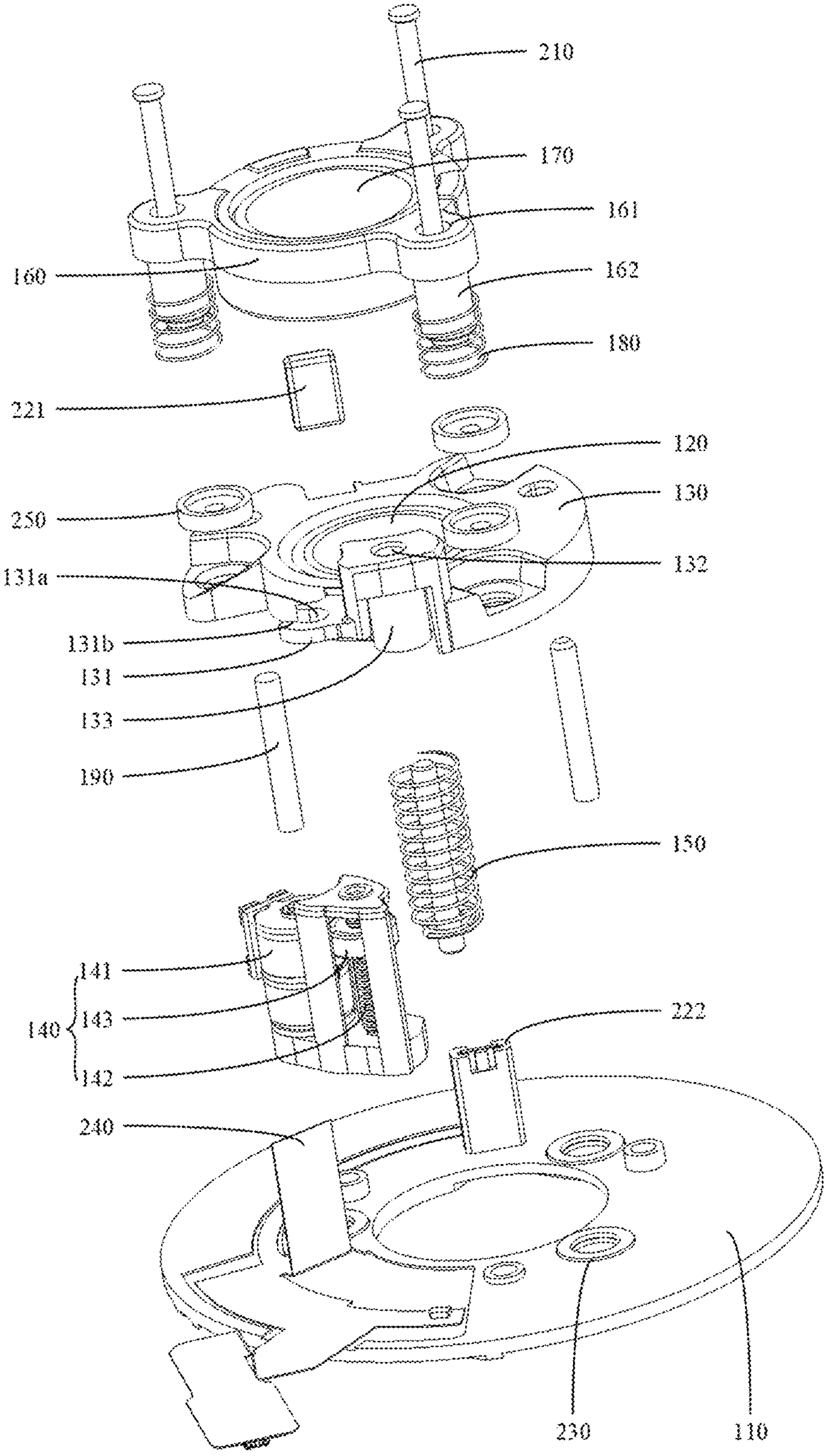
FIG. 4 is an exploded view of a camera module according to an embodiment of this application.

Refer to FIG. 1 to FIG. 4. An embodiment of this application discloses a camera module including a base 110, a photosensitive chip, a first lens 120, a first support 130, a driving mechanism 140, and a first elastic member 150.

The photosensitive chip is disposed on the base 110, and the base 110 may be provided with other devices of the camera module in addition to the photosensitive chip. The first support 130 is movably disposed on the base 110, the first support 130 is provided with the first lens 120, and a connecting convex portion 131 is disposed on an edge of the first support 130. The photosensitive chip may be configured to receive light passing through the first lens 120 and ultimately convert a light signal into a digital image signal to obtain an image.

The driving mechanism 140 includes a driving source 141, a lead screw 142, and a nut 143, the driving source 141 is disposed on the base 110, the driving source 141 is connected to the lead screw 142, and the nut 143 is in thread fit with the lead screw 142; one end of the first elastic member 150 is connected to the base 110, the other end of the first elastic member 150 is connected to the first support 130, and the connecting convex portion 131 of the first support 130 is pressed against the nut 143 under the action of the first elastic member 150. In other words, the first support 130 and the nut 143 are disposed separately and may be pressed against each other through the connecting convex portion 131 or may be separated from each other. Optionally, the base 110 may include a base plate, where the base plate may be provided with the driving source 141. As the first elastic member 150 can exert an acting force on the connecting convex portion 131 to cause the connecting convex portion 131 to press the nut 143, a thread clearance between the nut 143 and the lead screw 142, a clearance between transmission components, and a return difference are reduced, thereby improving transmission precision. The driving source 141 may be a motor, and the motor is connected to an electrical connection member 240, to supply power to the driving source 141. The electrical connection member 240 may be a wire, a flexible circuit board, and other components. Further, optionally, the driving mechanism 140 further includes a first gear 144, a second gear 145, and a third gear 146. The first gear 144 is disposed on an output shaft of the driving source 141, the third gear 146 is disposed on the lead screw 142, and the first gear 144 engages with the third gear 146 through the second gear 145, to implement transmission between the driving source 141 and the lead screw 142.

The driving source 141 may drive the lead screw 142 to rotate, the lead screw 142 may drive the nut 143 to move along a first direction, and the nut 143 further drives, through the connecting convex portion 131, the first support 130 to move along the first direction, thereby implementing zoom of the camera module. To be specific, the driving mechanism 140 drives the connecting convex portion 131 through the nut 143, to drive the first support 130 to move along the first direction. The first direction herein is a direction close to or away from the photosensitive chip. Optionally, the driving source 141 and the lead screw 142 may be disposed in parallel, and both extend in the first direction, thereby making a structure of the driving mechanism 140 more compact. It should be noted that the nut 143 herein is not necessarily a standard part, provided that the nut is provided with an internal thread. Such a driving mechanism 140 has advantages of a compact structure and high transmission precision.

In a case that the first support 130 is subjected to an external force, the first elastic member 150 is capable of making the first support 130 move along a direction close to the photosensitive chip. The external force herein is a force generated due to human pressure, collision, or the like, and the external force does not include a driving force applied to the first support 130 by the driving mechanism 140. When the first support 130 is subjected to the external force, the external force acts on the first elastic member 150, the first elastic member 150 may be deformed to make the first support 130 move along the direction close to the photosensitive chip, and the first support 130 and the nut 143 may be separated from each other. In other words, the first elastic member 150 not only can implement cushioning, but also can change connection/disconnection of a transmission path between the nut 143 and the first support 130, to ensure that the driving force output by the driving mechanism 140 can be transmitted between the nut 143 and the first support 130, and ensure that the external force cannot be transmitted to the nut 143 through the first support 130. Because the first elastic member 150 has a cushioning effect, parts such as the first support 130 and the driving mechanism 140 included in the camera module are not prone to be damaged by the external force. Therefore, such a camera module has a longer lifespan.

In an optional embodiment, the connecting convex portion 131 may be a solid block structure like a rectangle. When the connecting convex portion 131 is pressed against the nut 143, a contact area between the two parts is small, which is not conducive to reliable transmission of the acting force. Therefore, in another embodiment, the connecting convex portion 131 is provided with a through hole 131*a*, one end of the lead screw 142 passes through the through hole 131*a*, and there is a clearance between the through hole 131*a* and the lead screw 142. That is, the connecting convex portion 131 may be disposed along a peripheral direction of the lead screw 142, thereby making a contact area between the connecting convex portion 131 and the nut 143 larger when the two parts are pressed against each other, thereby facilitating reliable transmission of the acting force. In addition, there is a clearance between the through hole 131*a* and the lead screw 142, which can avoid scratching of the connecting convex portion 131 when the lead screw 142 rotates.

The through hole 131*a* provided on the connecting convex portion 131 may be a closed hole provided around the peripheral direction of the lead screw 142. In this case, when the camera module is assembled, the lead screw 142 can enter the through hole 131*a* from only one side of the connecting convex portion 131. This affects an installation order of the camera module. For this reason, in another embodiment, a notch 131*b* is provided at an edge of the connecting convex portion 131, and the notch 131*b* is in communication with the through hole 131*a*. In this case, the through hole 131*a* is not a closed hole, and the lead screw 142 can enter the through hole 131*a* through the notch 131*b*, thereby implementing assembly of the first support 130 and the lead screw 142. Because the lead screw 142 can enter the through hole 131*a* from one side of the connecting convex portion 131, this structure is not overly restrictive on an installation order of the camera module, and it is more convenient for assembly of the camera module.

To expand a zoom range of the camera module, the camera module further includes a second support 160 and a second lens 170, the second support 160 is movably disposed on the first support 130, the second support 160 is provided with the second lens 170, and the first lens 120 is located between the second lens 170 and the photosensitive chip. Optionally, a driving member may be disposed on the first support 130. The driving member includes a telescopic cylinder or a coil magnet assembly, and other driving solutions may be used, provided that the second support 160 can be driven to move relative to the first support 130. Because a distance between the second lens 170 and the first lens 120 can vary, more zoom ratios can be obtained by moving the second lens 170.

It should be noted that the number of first lens 120 and the number of second lens 170 may both be one, or at least two. Specific numbers may be determined according to imaging requirements of the camera module, and are not limited in this embodiment of this application.

Optionally, the camera module further includes a second elastic member 180, the second elastic member 180 is disposed between the first support 130 and the second support 160, and the driving mechanism 140 drives, through the first support 130 and the second elastic member 180, the second support 160 to move along the first direction. In a case that the second support 160 is subjected to an external force, the second elastic member 180 may cause the second support 160 to move along the direction close to the photosensitive chip. When the driving mechanism 140 applies an acting force to the first support 130, the first support 130 moves while the second support 160 can be driven by the second elastic member 180, thereby implementing synchronous movement of the first lens 120 and the second lens 170. When the second support 160 is subjected to the external force, the second elastic member 180 can be deformed to cushion the external force, thereby preventing damage to the components such as the first support 130 and the second support 160 due to the external force. In addition, the second elastic member 180 may allow the second support 160 to move relative to the first support 130, so that the distance between the second lens 170 and the first lens 120 may be changed, thereby implementing zoom, and such a zoom solution has advantages such as a simple structure.

To enhance smoothness during movement of the first support 130, the camera module further includes a first guide column 190, one of the base 110 and the first support 130 is provided with a first guide portion 132 and the other is fixedly connected to the first guide column 190, and the first guide portion 132 slidably cooperates with the first guide column 190. In this embodiment, the first guide column 190 may limit lateral movement of the first support 130, thereby providing guidance for movement of the first support 130, so that the first support moves more smoothly. Optionally, the first support 130 may adopt a circular structure. Further, optionally, a plurality of first guide columns 190 may be provided. The plurality of first guide columns 190 may be evenly spaced apart along a circumferential direction of the first support 130, and the plurality of first guide columns 190 cooperate with a plurality of first guide portions 132 in a one-to-one correspondence, to optimize a guiding effect.

To enhance smoothness during movement of the second support 160, the camera module further includes a second guide column 210, one of the first support 130 and the second support 160 is provided with a second guide portion 161 and the other is fixedly connected to the second guide column 210, and the second guide portion 161 slidably cooperates with the second guide column 210. In this embodiment, the second guide column 210 may limit lateral movement of the second support 160, thereby providing guidance for movement of the second support 160, so that the second support moves more smoothly. Optionally, the second support 160 may adopt a circular structure. Further, optionally, a plurality of second guide columns 210 may be provided. The plurality of second guide columns 210 may be evenly spaced apart along a circumferential direction of the second support 160, and the plurality of second guide columns 210 cooperate with a plurality of second guide portions 161 in a one-to-one correspondence, to optimize a guiding effect.

Optionally, both of the first guide portion 132 and the second guide portion 161 may be provided as guide holes, to increase a contact area between the first guide portion 132 and the second guide column 210 and a contact area between the second guide portion 161 and the second guide column 210, thereby improving a guiding effect. In addition, the camera module may further include a sliding bearing 250, and at least one of the first guide column 190 and the second guide column 210 cooperates with the sliding bearing 250 to reduce wear generated during movement.

A position of connection between the first elastic member 150 and the first support 130 may be offset from a position of the first guide column 190. Considering that the first elastic member 150 is prone to transverse deformation, an additional limit component needs to be provided to restrict the transverse deformation of the first elastic member 150. In other embodiments, the first guide column 190 may be sleeved with the first elastic member 150. In this way, the transverse deformation of the first elastic member 150 can be restricted by the first guide column 190, and there is no need to additionally provide the limit component to restrict the transverse deformation of the first elastic member 150. Therefore, in this embodiment, parts included in the camera module can be reduced, thereby reducing costs of the camera module and reducing a space occupied by the camera module.

In a further optional embodiment, a first extension portion 133 is disposed on a surface of the first support 130 facing away from the second support 160, the first extension portion 133 is provided with the first guide portion 132, and the first extension portion 133 is at least partially located in the first elastic member 150. In this embodiment, the first extension portion 133 may serve as a connection portion between the first support 130 and the first elastic member 150, and may assist in restricting the transverse deformation of the first elastic member 150 after at least partially stretching into the first elastic member 150. This is more conducive to prolonging a lifespan of the first elastic member 150. In addition, a size of the first guide portion 132 is smaller than that of the first extension portion 133, and a size of the first guide column 190 may be reduced accordingly, thereby reducing the space occupied by the camera module on the basis of implementing guidance as well as restricting the transverse deformation of the first elastic member 150.

A position of connection between the second elastic member 180 and the second support 160 may be offset from a position of the second guide portion 161. In this case, a structure of the second support 160 is less compact and a difficulty of designing the structure of the second support 160 increases. For this reason, a second extension portion 162 is disposed on a surface of the second support 160 facing the first support 130, the second extension portion 162 is provided with the second guide portion 161, and the second extension portion 162 is capable of at least partially stretching into the second elastic member 180. In this embodiment, the second extension portion 162 may serve as a connection portion between the second support 160 and the second elastic member 180, and may assist in restricting transverse deformation of the second elastic member 180 after at least partially extending into the second elastic member 180. This is more conducive to prolonging a lifespan of the second elastic member 180. Because the second extension portion 162 and the second guide portion 161 are integrally disposed together, the second support 160 has a more compact structure, with less difficulty in its structural design, and the second support 160 is less likely to occupy space of other components. This is more conductive to an overall layout of the camera module. In addition, a size of the second guide portion 161 is smaller than that of the second extension portion 162, and a size of the second guide column 210 may be reduced accordingly, thereby reducing the space occupied by the camera module on the basis of implementing guidance as well as restricting the transverse deformation of the second elastic member 180.

Further, optionally, the first extension portion 133 is provided with a first counterbore, and the first guide portion 132 may be disposed on a bottom surface of the first counterbore. Compared with a solution in which the first guide portion 132 runs through the entire first extension portion 133, this embodiment enables the first guide portion 132 to run through only a part of the first extension portion 133, and an end of the first guide column 190 away from the base 110 can be closer to the base 110, expanding the adjustment range of a distance between the first support 130 and the second support 160, thereby enlarging the zoom range.

Similarly, the second extension portion 162 is provided with a second counterbore, and the second guide portion 161 may be disposed on a bottom surface of the second counterbore. Compared with a solution in which the second guide portion 161 runs through the entire second extension portion 162, this embodiment enables the second guide portion 161 to run through only a part of the second extension portion 162, and an end of the second guide column 210 away from the first support 130 can be closer to the first support 130, expanding the adjustment range of a distance between the first support 130 and the second support 160, thereby enlarging the zoom range.

Further, optionally, the camera module further includes a position detection means 220. The position detection means 220 includes a magnetic member 221 and a detection element. One of the base 110 and the first support 130 is provided with the magnetic member 221 and the other is provided with the detection element 222. The detection element 222 may be connected to the electrical connection member 240, to implement power supply for the detection element 222. When the first support 130 moves relative to the base 110, a magnetic field distribution of the magnetic member 221 changes, and the detection element 222 can sense this change. In this way, the position of the first support 130 relative to the base 110 is measured based on this change to facilitate more precise control, based on a detected value, of the movement of the first support 130. Optionally, the magnetic member 221 herein may be a magnet and the detection element 222 may be a Hall element.

Optionally, the connecting convex portion 131 may be located on a side of the nut 143 facing away from the photosensitive chip. In this case, a distance between the connecting convex portion 131 and the base 110 is larger, and therefore the connecting convex portion 131 easily protrudes with respect to a side of the first support 130 facing away from the base 110. As a result, the first support 130 occupies a large space. Based on this, the connecting convex portion 131 can be located between the nut 143 and the photosensitive chip, thereby reducing the distance between the connecting convex portion 131 and the base 110, reducing a probability that the connecting convex portion 131 protrudes with respect to the side of the first support 130 facing away from the base 110, and making it easier to reduce a space occupied by the first support 130.

The first elastic member 150 may be either always in a stretched state or always in a compressed state, to ensure that the connecting convex portion 131 is pressed against the nut 143. Comparatively speaking, in the latter embodiment, the first elastic member 150 occupies a smaller space, so that the first elastic member 150 can be in a compressed state. Further, when the connecting convex portion 131 is located between the nut 143 and the photosensitive chip, the first elastic member 150 is disposed between the first support 130 and the base 110, to fully utilize a space between the first support 130 and the base 110, making the structure of the camera module more compact.

To improve a cushioning effect, the base 110 is provided with a cushioning member 230. The cushioning member 230 faces the first support 130. During movement of the first support 130, even if the first support 130 is close to the base 110, the first support 130 may not be directly collide with the base 110, but comes into contact with the cushioning member 230. The cushioning member 230 may be deformed after being subjected to a force, thereby implementing the cushioning effect. Optionally, the cushioning member 230 may adopt a sheet structure to increase a contact area between the cushioning member 230 and the first support 130. Furthermore, one cushioning member 230 or at least two cushioning members 230 may be provided. When at least two cushioning members 230 are provided, the cushioning members 230 may be spaced apart by surrounding an optical axis of the first lens 120.

Embodiments of this application further disclose an electronic device. The electronic device includes the camera module in any one of the foregoing embodiments.

The electronic device disclosed in embodiments of this application may be a smartphone, a tablet computer, an e-book reader, a wearable device (for example, a smart watch), a game console, or other electronic devices. A type of the electronic device is not specifically limited in embodiments of this application.

The foregoing describes embodiments of this application in combination with the accompanying drawings, but this application is not limited to the foregoing specific implementations. The foregoing specific implementations are merely schematic rather than restrictive. Those of ordinary skill in the art can make many forms under the inspiration of this application, without departing from a tenet of this application and the scope protected by the claims, all of which belong to the protection scope of this application.

What is claimed is:

1. A camera module, comprising a base, a photosensitive chip, a first lens, a first support, a driving mechanism, and a first elastic member, wherein the photosensitive chip is disposed on the base, the first support is movably disposed on the base, the first support is provided with the first lens, and a connecting convex portion is disposed on an edge of the first support;

the driving mechanism comprises a driving source, a lead screw, and a nut, the driving source is disposed on the base, the driving source is connected to the lead screw, and the nut is in thread fit with the lead screw; one end of the first elastic member is connected to the base, another end of the first elastic member is connected to the first support, and the connecting convex portion is pressed against the nut under an action of the first elastic member; and the driving mechanism drives the connecting convex portion through the nut, to drive the first support to move along a first direction, wherein the first direction is a direction close to or away from the photosensitive chip; and in a case that the first support is subjected to an external force, the first elastic member enables the first support to move along a direction close to the photosensitive chip; wherein the camera module further comprises a second support and a second lens, the second support is movably disposed on the first support, the second support is provided with the second lens, and the first lens is located between the second lens and the photosensitive chip;

the camera module further comprises a second elastic member, and the second elastic member is disposed between the first support and the second support;

the driving mechanism drives, through the first support and the second elastic member, the second support to move along the first direction; and in a case that the second support is subjected to an external force, the second elastic member enables the second support to move along a direction close to the photosensitive chip.

2. The camera module according to claim 1, wherein the connecting convex portion is provided with a through hole, one end of the lead screw passes through the through hole, and there is a clearance between the through hole and the lead screw.

3. The camera module according to claim 2, wherein a notch is provided at an edge of the connecting convex portion, and the notch is in communication with the through hole.

4. The camera module according to claim 1, wherein the camera module further comprises a first guide column, one of the base and the first support is provided with a first guide portion and another is fixedly connected to the first guide column, and the first guide portion slidably cooperates with the first guide column; and the camera module further comprises a second guide column, one of the first support and the second support is provided with a second guide portion and another is fixedly connected to the second guide column, and the second guide portion slidably cooperates with the second guide column.

5. The camera module according to claim 4, wherein the first guide column is sleeved with the first elastic member.

6. The camera module according to claim 4, wherein a first extension portion is disposed on a surface of the first support facing away from the second support, the first extension portion is provided with the first guide portion, and the first extension portion is at least partially located in the first elastic member; and a second extension portion is disposed on a surface of the second support facing the first support, the second extension portion is provided with the second guide portion, and the second extension portion is capable of at least partially stretching into the second elastic member.

7. The camera module according to claim 1, wherein the camera module further comprises a position detection means, the position detection means comprises a magnetic member and a detection element, one of the base and the first support is provided with the magnetic member and another is provided with the detection element.

8. The camera module according to claim 1, wherein the connecting convex portion is located between the nut and the photosensitive chip.

9. The camera module according to claim 1, wherein the first elastic member is in a compressed state.

10. The camera module according to claim 1, wherein the base is provided with a cushioning member, and the cushioning member faces the first support.

11. An electronic device, comprising a camera module; wherein the camera module comprises a base, a photosensitive chip, a first lens, a first support, a driving mechanism, and a first elastic member, wherein the photosensitive chip is disposed on the base, the first support is movably disposed on the base, the first support is provided with the first lens, and a connecting convex portion is disposed on an edge of the first support;

the driving mechanism comprises a driving source, a lead screw, and a nut, the driving source is disposed on the base, the driving source is connected to the lead screw, and the nut is in thread fit with the lead screw; one end of the first elastic member is connected to the base, another end of the first elastic member is connected to the first support, and the connecting convex portion is pressed against the nut under an action of the first elastic member; and the driving mechanism drives the connecting convex portion through the nut, to drive the first support to move along a first direction, wherein the first direction is a direction close to or away from the photosensitive chip; and in a case that the first support is subjected to an external force, the first elastic member enables the first support to move along a direction close to the photosensitive chip; wherein the camera module further comprises a second support and a second lens, the second support is movably disposed on the first support, the second support is provided with the second lens, and the first lens is located between the second lens and the photosensitive chip;

the camera module further comprises a second elastic member, and the second elastic member is disposed between the first support and the second support;

the driving mechanism drives, through the first support and the second elastic member, the second support to move along the first direction; and in a case that the second support is subjected to an external force, the second elastic member enables the second support to move along a direction close to the photosensitive chip.

12. The electronic device according to claim 11, wherein the connecting convex portion is provided with a through hole, one end of the lead screw passes through the through hole, and there is a clearance between the through hole and the lead screw.

13. The electronic device according to claim 12, wherein a notch is provided at an edge of the connecting convex portion, and the notch is in communication with the through hole.

14. The electronic device according to claim 11, wherein the camera module further comprises a first guide column, one of the base and the first support is provided with a first guide portion and another is fixedly connected to the first guide column, and the first guide portion slidably cooperates with the first guide column; and the camera module further comprises a second guide column, one of the first support and the second support is provided with a second guide portion and another is fixedly connected to the second guide column, and the second guide portion slidably cooperates with the second guide column.

15. The electronic device according to claim 14, wherein the first guide column is sleeved with the first elastic member.

16. The electronic device according to claim 14, wherein a first extension portion is disposed on a surface of the first support facing away from the second support, the first extension portion is provided with the first guide portion, and the first extension portion is at least partially located in the first elastic member; and a second extension portion is disposed on a surface of the second support facing the first support, the second extension portion is provided with the second guide portion, and the second extension portion is capable of at least partially stretching into the second elastic member.

* * * * *